United States Patent Office 3,100,385
Patented Aug. 13, 1963

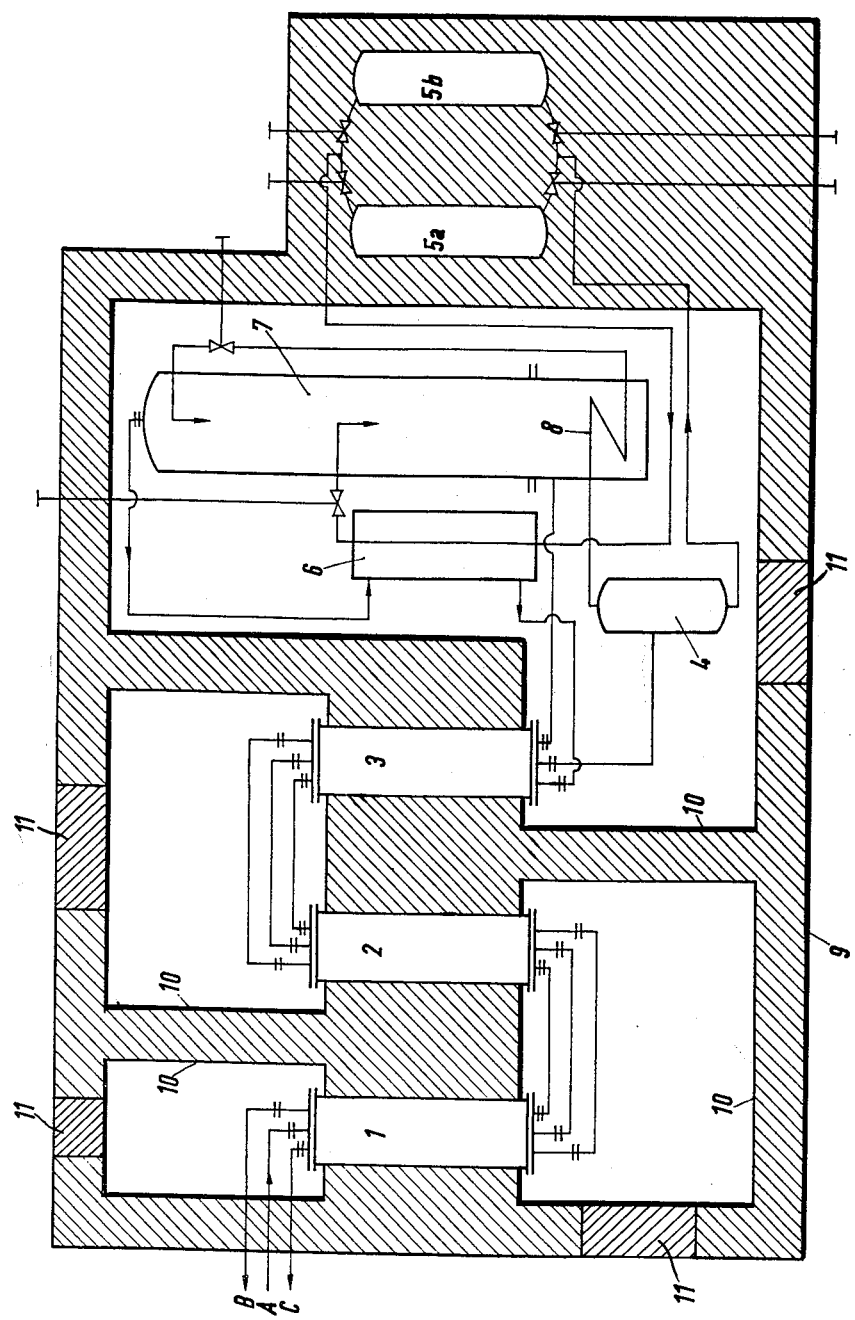

3,100,385
LOW TEMPERATURE UNITS WITH STOPPER INSULATION
Rudolf Becker, Munich-Solln, and Ernst Wittmann, Ludwigshafen (Rhine), Germany, assignors to Gesellschaft fur Linde's Eismaschinen Aktiengesellschaft, Hollriegelskreuth, near Munich, Germany, a German company
Filed July 25, 1960, Ser. No. 45,028
Claims priority, application Germany Mar. 31, 1959
1 Claim. (Cl. 62—447)

This invention relates to apparatus for and processes of separating and rectifying gas mixtures at low temperatures, and is concerned with improving the insulated low-temperature parts of gas-separating and purifying units.

In the designing of gas-separating and purifying units for low temperatures, the problem of insulating low-temperature parts constitutes an important part in the technology, since energy consumption is determined in part by the quality of insulation.

Cold insulation has, up to now, been effected in either one of two different ways: In small and middle-sized units, the so-called "plugged complete insulation" has been applied. All the parts to be insulated were enveloped in a single jacket and the space between them filled with insulating material, for example, mineral wool. In this way a very effective insulation was achieved, it is true, but this method has not proved practical, especially for larger units, since even in assembling the same the providing and placing of such large amounts of insulation material was troublesome. If repairs were necessary inside the low-temperature part, the insulation material had to be completely cleared from inconvenient locations in the place to be repaired, and had to be stored dry. Since such work could not be carried out during operation—because of dust and lack of space—a repair of a fully insulated unit always meant a long interruption of its operation. In the case of smaller repairs near the jacket, the insulation did not need to be fully removed, but the hollow spaces had to be supported by wood constructions which often could not be removed and increased the danger of fire. Another disadvantage of stuffing insulation is that it grows damp in time, and then the air contained in the insulation material is cooled in the cooling of the apparatus, so that moist air may flow through the leaks in the jacket. Finally, a unit so insulated is hard to inspect, since it is quite difficult to control the oxygen content within the insulation.

On the other hand, as a solution to the problem of insulating large units it has been proposed that the low-temperature part be surrounded by a double jacket, and only the space between the walls of the same be filled with insulation material; that is, that the apparatus be set into a cold chamber. This, too, has presented considerable difficulties. The inner wall of the chamber is exposed, in cooling, to a temperature difference of almost 200° C. and therefore to considerable change in length. To prevent cracks in this wall it must consist of elements which can compensate the dimensional changes in the plane of the wall. For example, the wall is formed of plates lapped like roofing tiles, which overlapping plates hang on supports which can move lengthwise freely. Since, also, during operation considerable differences in temperature occur between different parts of the apparatus, parts which can take different temperatures during operation are insulated from each other. Otherwise there is danger of cold losses through convection inside the chamber. To prevent the insulating material inside the double-walled jacket from becoming moist, the sealing of the jacket on the outside must be watched closely. Pipelines must be led through the wall by means of stuffing boxes, passage flanges, or the like.

An object of the present invention is, therefore, to overcome the defects of the low-temperature insulations heretofore known; that is, to provide a better arrangement of insulation, which has the advantages of the present techniques while excluding their disadvantages.

This problem is solved with the aid of a unit for the separating or purifying of gas mixtures at low temperatures, in which the low-temperature part for the purpose of insulation is surrounded by a mantle, the space enclosed by this mantle being filled with a bulk insulating material and which is distinguished by the fact that in the space filled, in the usual way, with insulating material, at those points at which apparatus parts are located in which leaks can occur, spaces accessible from outside are provided, while within such a space there are placed only parts with a temperature difference of at most 50° C.

It is further provided—according to this invention—that units which bridge a considerable difference in temperature be surrounded, between head and foot, with insulating material.

This invention is illustrated, for example, in the accompanying drawing which is a schematic representation of the cold box of a plant for separating gas mixtures at low temperatures. The drawing shows the outer jacket surrounding all parts of the separation plant which have a temperature of below 230 to 273° K., and further the separate inner jackets, each of them surrounding those parts of the separation plant which must be accessible for repair purposes and which have a maximum temperature difference of 50° C.; the drawing finally shows the bulk insulation material between the outer and inner jackets indicated by hatching, in which the regenerators which bridge a considerable temperature difference and adsorbers which do not have to be repaired frequently are embedded, and the man-holes by which the inner jackets may be entered. In particular, the cold box shown in the drawing consists of several coolers, 1, 2, and 3, in which the crude gas flowing in at A absorbs the cold of the residual gases led out of the unit at B and of the pure gas removed at C. In the present case, three heat exchangers are provided for the cooling of the crude gas to 100° K., of which the first has at the warm end a temperature which can be reached by ammonia cooling of about 230° K. and at the cold end a temperature of 190° K. In the second counter flow cooler (heat exchanger) the crude gas is cooled to 150° K., and in the third to 100° K. The part of the crude gas which is fluid at this temperature is removed into a separator 4, sent through a detachable pair of filters 5a and 5b to remove the solid substances precipitated, and after deep cooling in the counter-flow cooler 6, introduced into the center of column 7. The gaseous part of the crude gas leaving separator 4 is fluidized in a coil 8 in the sump of column 7, and fed to the head of the column as a washing fluid. The temperature at the head of the column amounts to about 80° K.

The insulation of such a unit is effected as follows: First, a single jacket 9 of sheet metal is arranged around all the low-temperature parts. Moreover, all apparatus parts in which leaks might occur, such as the flanges and pipes to and from the heat exchangers, as well as the respective valves, and also the rectifying column with the heat exchanger and separator, are surrounded by jackets 10 in such manner that only such parts as have temperature differences of less than 50° C. are placed within such a jacket. The intermediate spaces between the outer jacket 9 and the inner jacket 10 are then filled with insulating material (cross-hatched in the drawings). The spaces not filled with insulating material inside jacket 10 are accessible from the outside, for example, through doors 11, 11.

The conventional stuffed full insulation is thus improved according to this invention by the fact that within this insulation, spaces are provided adjacent to apparatus parts which are likely to need repair. In the case of the gas purifying unit shown, the pipelines leading to the warm end of the first cooler are placed in a special chamber. The cold end of the first, and the warm end of the second, heat exchanger 2 have about the same temperature and so are situated in a common chamber. The same is true for the cold end of the second and the warm end of the third heat exchanger 3. The rectification column 7 is placed in another chamber, together with the cold end of the third cooler, the separator 4, the heat exchanger 6 and the pipelines belonging thereto, while for the filters 5a and 5b no special spaces are provided.

The advantages of such an insulation lie in the fact that the amount of insulating material can be reduced to a tolerable amount, and that the good insulating effect realized by stuffed full insulation is still substantially retained. Moreover, the parts which must most often be repaired, such as the connections, for example, the connections between the vessels and the pipelines are easily accessible, while cold losses through convection, as they occur in so-called chamber insulation, are hardly to be dreaded, since the temperature-differences between the individual chambers are relatively slight. Those parts in particular which show a considerable temperature gradient, such as heat exchangers for example, are still practically completely insulated for their whole length, as well as parts which must be strained, that is, heated, during operation, such as the filters 5a and 5b, for example.

To prevent the occurrence of air-gas mixtures in the spaces within the insulation, and thus to reduce the danger of fire, it is advantageous to blow nitrogen into these free spaces.

We claim:
A system for separating gas mixtures by cooling and fractionation at low temperatures, which consists of a cold box comprising heat exchangers, separators, counter-flow subcoolers, adsorbers and rectifying columns, said cold box having a plurality of chambers individually insulated, which insulation consists of an outer jacket surrounding all parts of the system which have a temperature of below about 230° K. to 273° K., which further consists of separate inner jackets, each of said inner jackets surrounding parts of the system which must be accessible for repair purposes and which have between each other a maximum temperature difference of no more than about 50° C.; one of said inner jackets surrounding the warm end of the first heat exchanger, further inner jackets surrounding the cold end of each heat exchanger together with the warm end of each following heat exchanger, a further inner jacket surrounding the cold end of the last heat exchanger, a separator, a counter-flow subcooler and a rectifying column; in which the space between the outer jacket and said inner jackets is filled with bulk insulating material thereby embedding the heat exchangers which have between their warm and cold ends a considerable temperature difference particularly a temperature difference of more than 50° C. and further embedding the adsorbers which are inaccessible.

References Cited in the file of this patent
UNITED STATES PATENTS

| | | |
|---|---|---|
| 652,058 | Tripler | June 19, 1900 |
| 2,270,407 | Blood et al. | Jan. 20, 1942 |
| 2,951,346 | Collins et al. | Sept. 6, 1960 |
| 3,005,317 | Bunn | Oct. 24, 1961 |
| 3,030,780 | Loveday | Apr. 24, 1962 |

FOREIGN PATENTS

| | | |
|---|---|---|
| 181,352 | Great Britain | Apr. 19, 1923 |